United States Patent Office 3,704,304
Patented Nov. 28, 1972

3,704,304
5(7)-ACETAMIDO-3-(SUBSTITUTEDPHENYL)-2,3-DIHYDRO - 3-HYDROXY-7(5)H-THIAZOLO(3,2-ALPHA)PYRIMIDINE - 2 - ALKANOIC ACID, ALKYL ESTERS
Peter H. L. Wei, Springfield, and Stanley C. Bell, Penn Valley, Pa., assignors to American Home Products Corporation, New York, N.Y.
No Drawing. Filed Mar. 17, 1971, Ser. No. 125,376
Int. Cl. C07d 99/10
U.S. Cl. 260—256.5 R                    2 Claims

ABSTRACT OF THE DISCLOSURE

A novel series of compounds are described which are biologically active as inhibitors of *Mycobacterium tuberculosis*. The compounds are characterized as (5(7)-acetamido - 3 - (substitutedphenyl) - 2,3 - dihydro - 3 - hydroxy - 7(5) - oxo - 7(5)H - thiazolo[3,2 - a]pyrimidine-2-alkanoic acid, alkyl esters.

---

The compounds of the invention are those of Formula I:

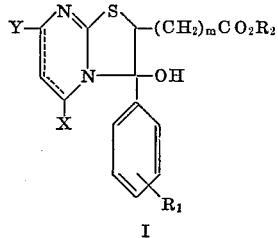

wherein X and Y are different and are oxygen or acetamido; the dotted lines indicate the presence or absence of a double bond; $R_1$ is selected from the group consisting of hydrogen, (lower)alkyl, halogen, phenyl, trifluoromethyl, nitro, amino and (lower)alkoxy; $R_2$ is (lower)alkyl; $m$ is the integer one or two. The exact configuration of the compounds of the invention has not been ascertained but the compounds of the invention exist in one of the following structures:

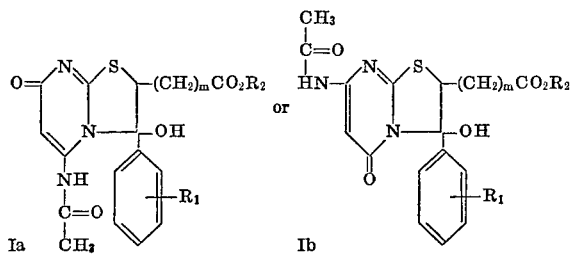

wherein $R_1$ and $R_2$ are the same as hereinabove described.

The compounds of the invention may be prepared by the following reaction scheme:

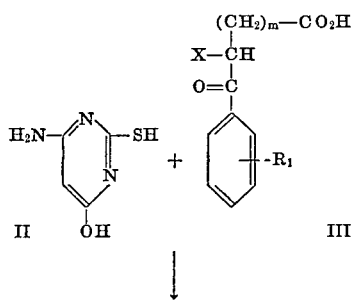

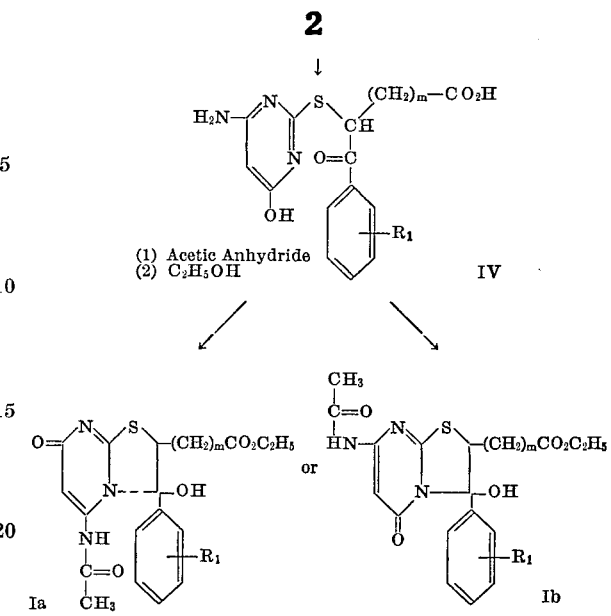

wherein $R_1$ and $m$ are the same as hereinabove described; and X is halogen. Compounds wherein $R_2$ is methyl, n-propyl, i-propyl, n-butyl and the like may be prepared by employing the appropriate ester in place of the acid of Formula III.

Those skilled in the art will appreciate that since the compounds are obtained through ring closure of compounds of Formula IV, there is no absolute method of predicting what the exact structure of the final product will be. The reason for this is the carbon bearing the ketone carbonyl may cyclize with either nitrogen of the pyrimido ring. For this reason the alternate nomenclature has been employed.

The compounds of the invention are useful for the in vitro inhibition of *M. tuberculosis*. The compounds thus may be employed for example in hospitals, sanitariums and the like to effectively inhibit the causative organism of tuberculosis by contacting infected areas and materials with aqueous dispersion of said compounds. The compound described hereinafter as the best mode embodiment of the invention was found to be active in completely inhibiting *Mycobacterium tuberculosis*, human type, strain H37Rv when applied as an aqueous dispersion at a concentration as low as 1 ug./ml.

EXAMPLE I

5(7) - acetamido - 3 - (p - chlorophenyl) - 2,3 - dihydro-7(5) - oxo - 7(5)H - thiazolo[3,2-a]pyrimidine - 2-acetic acid, ethyl ester To an aqueous suspension of 3-bromo-3-(p-chlorobenzoyl) propionic acid (23.28 g., 0.08 m.) and 4-amino-6-hydroxy-2-mercaptopyrimidine monohydrate (12.88 g., .08 m.) was added an aqueous solution of potassium hydroxide (13.44 g., 0.24 m.). The mixture was stirred at room temperature overnight. A small amount of insoluble material was filtered off. The filtrate was neutralized with acetic acid. The crude 3-(4-amino-6-hydroxy-2-mercaptopyrimidinyl)-3-(p-chlorobenzoyl)propionic acid, after having been washed with water and having been dried at room temperature, weighed 25.6 g. The acid was purified by dissolution of the crude material in dimethoxyethane and precipitation with benzene.

3 - (4 - amino - 6 - hydroxy - 2 - mercaptopyrimidinyl)-3-(p-chlorobenzoyl)propionic acid (6.0 g.) was heated in 25 ml. acetic anhydride on a steam bath for 4 hours. After the solvent was removed, the residue was dissolved in ethanol. From ethanol solution 3.0 g. of solid was obtained. The pure ethyl ester of 5(7)-acetamido-3-(p-chlorophenyl) - 2,3 - dihydro - 3 - hydroxy - 7 - oxo-7(5)H - thiazolo[3,2-a]pyrimidine - 2 - acetic acid, after recrystallization from acetone, gave a melting point of 172–4°.

Analysis.—Calcd. for $C_{18}H_{18}ClN_3O_5S$ (percent): C, 51.00; H, 4.28; N, 9.92. Found (percent): C, 50.71; H, 4.27; N, 10.26.

IR: OH and NH at 3.0 and 3.15μ, ester carbonyl at 5.85μ and amide carbonyl at 6.10μ. NMR (DMSO-$d_6$): $C_2H_5O$, triplet at 1.5 δ and quartet at 4.1 δ; methyl at 2.15 δ; which was split; other aliphatic at 3.0 δ; aromatic at 7.5 δ.

EXAMPLE II

By methods analogous to those described above the following compounds may be prepared:

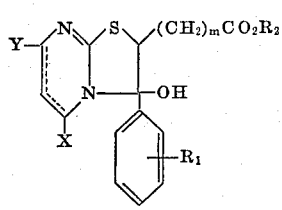

wherein X and Y are different and are oxygen or acetamido; the dotted lines indicate the presence or absence of a double bond; $R_1$, $R_2$ and $m$ are as follows:

| | | |
|---|---|---|
| Hydrogen | Ethyl | 1 |
| p-Bromo | Methyl | 2 |
| p-Iodo | Ethyl | 1 |
| p-Phenyl | do | 1 |
| m-Trifluoromethyl | Methyl | 2 |
| p-Nitro | n-Propyl | 1 |
| m-Amino | Ethyl | 1 |
| p-Methoxy | i-Propyl | 2 |
| m-Ethoxy | Ethyl | 1 |
| p-Ethyl | do | 1 |
| m-Methyl | do | 1 |

We claim:
1. A compound, structurally depicted by one of the formulae:

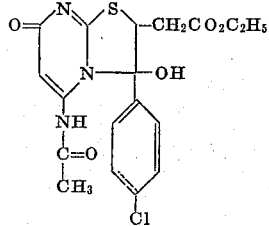

or

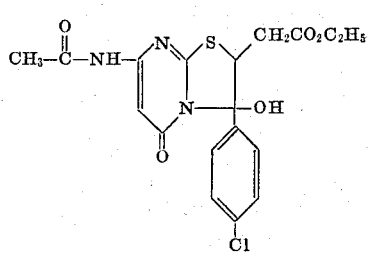

said compound having the following identifying characteristics:
(a) empirical formula $C_{18}H_{18}ClN_3O_5S$;
(b) absorption spectrum: the infrared absorption (KBr is as follows: OH and NH at 3.0 and 3.15μ, ester carbonyl at 5.85μ and amide carbonyl at 6.10μ;
(c) NMR (DMSO-$d_6$): $C_2H_5O$, triplet at 1.5 δ and quartet at 4.1 δ; methyl at 2.15 δ; which was split; other aliphatic at 3.0 δ; aromatic at 7.5 δ;
(d) melting point: 172–4° C.

2. 3 - (4 - amino - 6 - hydroxy - 2 - mercaptopyrimidinyl)-3-(p-chlorobenzoyl)propionic acid.

References Cited
UNITED STATES PATENTS

| | | | |
|---|---|---|---|
| 3,510,490 | 5/1970 | D'Amico | 260—256.5 |
| 3,538,086 | 11/1970 | Mair et al. | 260—256.5 |

ALEX MAZEL, Primary Examiner

R. J. GALLAGHER, Assistant Examiner

U.S. Cl. X.R.

260—999